US008797261B2

(12) United States Patent
Yuan

(10) Patent No.: US 8,797,261 B2
(45) Date of Patent: *Aug. 5, 2014

(54) IMAGE MANIPULATION BASED ON TRACKED EYE MOVEMENT

(71) Applicant: Peking University, Beijing (CN)

(72) Inventor: Xiaoru Yuan, Beijing (CN)

(73) Assignee: Peking University, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/024,015

(22) Filed: Sep. 11, 2013

(65) Prior Publication Data

US 2014/0028549 A1    Jan. 30, 2014

Related U.S. Application Data

(63) Continuation of application No. 12/567,684, filed on Sep. 25, 2009, now Pat. No. 8,564,533.

(30) Foreign Application Priority Data

Jul. 10, 2009    (CN) .......................... 2009 1 0139915

(51) Int. Cl.
*G09G 5/00* (2006.01)

(52) U.S. Cl.
USPC ............ 345/156; 345/619; 345/649; 345/660

(58) Field of Classification Search
CPC ... G06F 3/013; G06F 3/04845; G06F 3/0485; G02B 27/0093
USPC ........................................................ 345/156
See application file for complete search history.

(56) References Cited

U.S. PATENT DOCUMENTS

| 5,717,413 A | 2/1998 | Mizouchi |
| 5,850,211 A | 12/1998 | Tognazzini |
| 8,120,577 B2 | 2/2012 | Bouvin et al. |
| 8,564,533 B2 * | 10/2013 | Yuan .............................. 345/156 |

(Continued)

FOREIGN PATENT DOCUMENTS

| CN | 1694045 A | 11/2005 |
| CN | 101336089 A | 12/2008 |

(Continued)

OTHER PUBLICATIONS

Bojko: "Using Eye Tracking to Compare Web Page Designs: A Case Study", Journal of Usability Studies, vol. 1, No. 3, pp. 112-120, May 2006.

(Continued)

*Primary Examiner* — Lixi C Simpson
(74) *Attorney, Agent, or Firm* — Brundidge & Stanger, P.C.

(57) ABSTRACT

The disclosure relates to controlling and manipulating an image of an object on a display device based on tracked eye movements of an observer. When the object is displayed according to an initial view, the observer's eye movement is tracked and processed in order to determine the focus of the observer's attention or gaze on the image. Thereafter, the displayed image is modified to provide a better view of the part of the object in which the observer is most interested. This is accomplished by modifying at least one of the spatial positioning of the object within the viewing area, the angle of view of the object, and the viewing direction of the object.

18 Claims, 14 Drawing Sheets

(56) References Cited

U.S. PATENT DOCUMENTS

| | | |
|---|---|---|
| 2003/0020755 A1 | 1/2003 | Lemelson et al. |
| 2006/0038880 A1 | 2/2006 | Starkweather et al. |
| 2006/0238877 A1 | 10/2006 | Ashkenazi et al. |
| 2007/0229396 A1 | 10/2007 | Rajasingham |
| 2009/0110245 A1 | 4/2009 | Thorn |
| 2010/0156781 A1 | 6/2010 | Fahn |
| 2010/0231504 A1 | 9/2010 | Bloem et al. |
| 2010/0295706 A1 | 11/2010 | Mathan et al. |
| 2011/0109880 A1 | 5/2011 | Nummela |

FOREIGN PATENT DOCUMENTS

| | | | |
|---|---|---|---|
| CN | 101405680 A | 4/2009 | |
| JP | H07261728 A | 10/1995 | |
| JP | 10320109 A | 12/1998 | |
| JP | 2000010722 A | 1/2000 | |
| JP | 2002366271 A | 12/2002 | |
| JP | 2009514090 A | 4/2009 | |
| JP | 2009530731 A | 8/2009 | |
| WO | 2005010739 A1 | 2/2005 | |
| WO | 2007107949 A1 | 9/2007 | |

OTHER PUBLICATIONS

Akhtar et al.: "Handy-Eyes: A Real-Time Vision-Based User Interface", Proceeding of the LASTED International Conference (2004)—Artificial Intelligence and Applications, pp. 666-671.

Duchowski: "A Breadth-First Survey of Eye Tracking Applications", Behavior Research Methods, Instruments, and Computers (BRMIC), 34 (4), pp. 455-470, 2002.

International Search Report and Written Opinion for International Application No. PCT/CN2010/073009 mailed on Aug. 26, 2010.

Rayner et al.: "Eye Movements, the Eye-Hand Span, and the Perceptual Span During Sight- Reading of Music", Current Directions in Psychological Science, pp. 49-53, 1997.

Kumar et al.: "EyePoint: practical pointing and selection using gaze and keyboard," Proceedings of the SIGCHI Conference on Human Factors in Computing Systems, pp. 421-430, 2007.

Lee et al.: "Mesh Saliency", ACM Transactions on Graphics (Proceedings of SIGGRAPH 2005), vol. 24, No. 3, pp. 659-666.

\* cited by examiner

IMAGE MANIPULATION BASED ON TRACKED EYE MOVEMENT

CROSS-REFERENCED TO RELATED APPLICATIONS

The present application is a continuation application of U.S. patent application Ser. No. 12/567,684, filed Sep. 25, 2009, now U.S. Pat. No. 8,564,533, which claims priority to Chinese patent application No. 200910139915.X, filed Jul. 10, 2009, the entire disclosures of which are incorporated herein by reference.

BACKGROUND

Many computer applications utilize computer graphics to display images of objects to a user. For instance, computer graphics may be employed in an application to display a computer-generated model of a tangible object (e.g., a house or a car). Also, more abstract objects (e.g., a spherical-shaped map of the world) can be modeled and displayed in a computer application. Such objects may be defined in a two-dimensional space, or defined as a three-dimensional model, which is then rendered onto a two-dimensional viewing area (e.g., computer screen).

Furthermore, a computer application may provide a user interface which allows a user to modify the view of the object in the displayed image, in order to provide a better viewing experience. The user interface may include certain input devices, such as a mouse or keyboard, which are manipulated by the user to make it easier to view different parts of the displayed object. However, physically challenged individuals may find it difficult to use these types of input devices to manipulate the image.

SUMMARY

A method is described in the present disclosure which includes the steps of causing a display device to display a first image of an object in a predefined viewing area, obtaining data representative of a location of a tracked eye gaze with respect to the viewing area, processing the obtained data to determine a modification of the first image, and causing the display device to display a second image of the object including the modification. According to this method, the modification is made to the first image with respect to at least one of the following: viewing direction of the object, an angle of view of the object, and a spatial position of the object with respect to the viewing area.

According to the present disclosure, the aforementioned method, or any part thereof, may be performed by a computing device under the direction of a computer program embodied on a computer readable medium.

Furthermore, the present disclosure describes a system. The system includes a display device for displaying an image in a two-dimensional viewing area. The system also includes one or more computer processors programmed to cause the display device to display a first image of an object in a predefined viewing area, obtain data representative of a location of a tracked eye gaze with respect to the viewing area, process the obtained data to determine a modification of the first image with respect to at least one of: a viewing direction of the object, an angle of view of the object, and a spatial position of the object with respect to the viewing area. The one or more computer processors may also be programmed to cause the display device to display a second image of the object including the modification.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
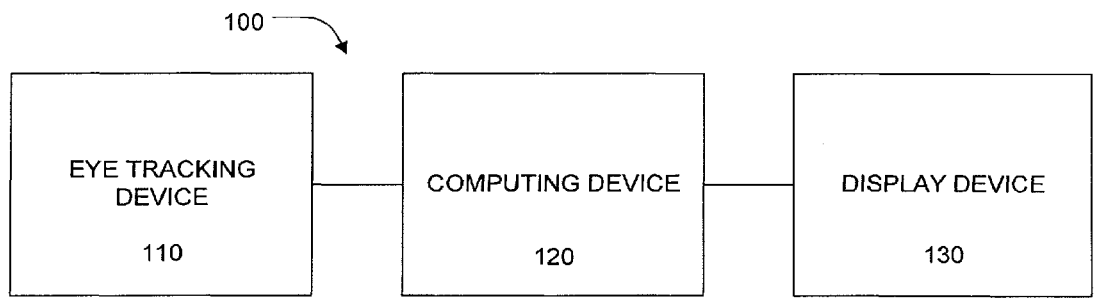
FIG. 1 is a block diagram illustrating a system arranged to display and modify images based on a tracked eye gaze, according to an example embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatuses, computer programs and systems related to controlling and manipulating an image of an object on a display device based on tracked eye movements of an observer. Particularly, as the object is displayed according to an initial view, the observer's eye movement is tracked and analyzed in order to determine the focus of the observer's attention or gaze on the image. Thereafter, the displayed image may be modified to provide a better view of the part of the object in which the observer is most interested. This can be done by modifying the spatial positioning of the object within the viewing area, the angle of view of the object, or the viewing direction of the object.

For example, the tracked gaze of the observer may cause the gazed-at part of the object to be moved to the center of the viewing area, thereby modifying the spatial positioning of the object in the viewing area. Further, if the observer's gaze is directed to a concentrated portion of the image, a zoom-in may be performed on this portion of the image thus changing the angle of view. On the other hand, if the tracked gaze indicates a wide scattering of gaze locations, a zoom-out may be performed to increase the angle of view of the object.

Furthermore, according to an example embodiment, the displayed image may be of a three-dimensional model and, as such, the surface of the object may be geometrically defined in a three-dimensional space, e.g., with (x, y, z) coordinates. In such an embodiment, the tracked gaze may be translated into the three-dimensional space in order to determine the particular surface region of the object being looked-at by the observer. Accordingly, by rotating the object, the viewing direction may be changed to face this surface region.

FIG. 1 is a block diagram illustrating a system 100 arranged to display and modify images based on a tracked eye gaze, according to an example embodiment. As shown in FIG. 1, the system 100 may include an eye tracking device 110, a computing device 120 communicatively connected to the eye tracking device 110, and a display device 130 which is controlled by the computing device 120.

Even though the eye tracking device 110, computing device 120, and display device 130 are illustrated as separate units in FIG. 1, this is not intended to be limiting. Although the eye tracking device 110 and the computing device 120 may be implemented as separate hardware apparatuses, it is also contemplated that the eye tracking device 110 and the computing device 120 can be integrated into one apparatus. In addition, the eye tracking device 110 have certain processing capabilities to perform some of the functions described below with respect to the computing device 120.

In a similar fashion, the display device 130 may either be implemented as a standalone device in one embodiment, or integrated in the same apparatus with the computing device 120 (e.g., in a notebook or laptop computer) and/or the eye tracking device 110. An example of an eye tracking device 110 integrated into a display device 130 can be found in the T60/T120 Eye Tracker manufactured by TOBII TECHNOLOGY AB.

Figure 2:
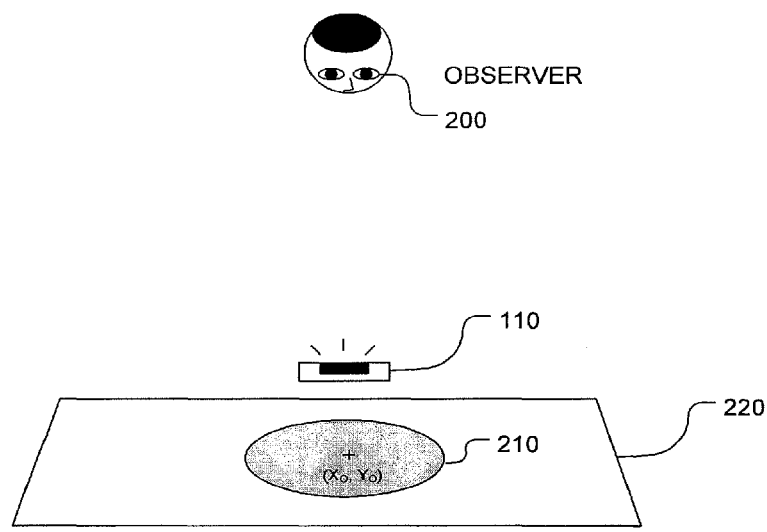
FIG. 2 illustrates an environment in which the system of FIG. 1 may be implemented, according to an example embodiment.

FIG. 2 illustrates an environment in which the system of FIG. 1 may be implemented. Particularly, this figure shows a perspective view of a viewing area 220 of the display device 130, the eyes 200 of an observer gazing at the viewing area 220, and the eye tracking device 110, situated in a manner to detect the movement of the observer's eyes 200. As noted above, even though the eye tracking device 110 is illustrated as a standalone device in FIG. 2, it could alternatively be integrated into the display device 130 and/or the computing device 120.

The eye tracking device 110 may be any of the multiple types of eye tracking devices currently available on the market. As such, the eye tracking device 110 may utilize different principles of operation for performing the detection and recording of eye movements. As an example, one of the eye trackers provided by TOBII TECHNOLOGY AB may be used as the eye tracking device 110 illustrated in FIGS. 1 and 2. As such, the eye tracking device 110 may utilize a light source (e.g., a series of light emitting diodes) to emit infrared or near infrared light toward each observer, and an image sensor configured to detect the pattern of infrared or near infrared light reflecting off the corneas of the observer's eyes 200, similar to the TOBII T/X Series Eye Trackers. Such an eye tracking device 110 may utilize one or more processors to execute processes for identifying a reflection pattern from the observer's eyes 200, detecting a gaze direction of the eyes 200 based on the identified reflection pattern, and mathematically transform the detected gaze direction to a data point (e.g., x and y coordinates) representing a gaze location on the viewing area 220. The eye tracking device 110 may generate these data points according to a predetermined sampling rate, e.g., 50-60 Hz (although some eye trackers are capable of a sampling rate of 120 Hz). Furthermore, a calibration may be performed in the eye tracking device 110 in order to learn the characteristics of a particular observer's eyes 200, thus facilitating the image processing in accurately recognizing the reflection pattern from that observer's eyes 200.

However, it is contemplated that other types of eye tracking devices 110 known in the art may be used. For example, such eye tracking devices 110 need not operate by detecting and processing infrared or near infrared light. It is contemplated that the eye tracking device 110 could be configured to sense and process light signals in the visible spectrum.

Furthermore, the viewing area 220 of the display device 130 is illustrated as a two-dimensional image plane. For example, the viewing area 220 could represent the screen of a computer monitor. Alternatively, if the display device 130 is a computer/video projector, the viewing area 220 may represent the screen (or other flat surface) onto which the image is projected. However, the foregoing is not intended to be limiting on the display device 130 and viewing area 220. For instance, it is contemplated that a display device 130 which projects images onto a three-dimensional viewing area (e.g., holographic images) could also be used.

Referring again to FIG. 2, an image of an object 210 is shown as being displayed in the viewing area 220. According to the particular example of FIG. 2, the object 210 is rendered on the viewing area 220 as a circular shape, spatially positioned with its center at the coordinates $(X_o, Y_o)$ of the viewing area 220. In this particular example, the object 210 may simply be defined in two-dimensions as a circle or, alternatively, may be defined in a three-dimensional space as a sphere. If the object 210 is defined in a three-dimensional space, e.g., as part of a three-dimensional model, the image may contain some additional imaging effects (not shown) to emphasize the three-dimensional nature, such as lighting and shadowing. A more detailed description of examples of processes for rendering and modifying an image of the object 210 will be provided below in connection with FIGS. 4A-4E.

The use of the term "image" in this disclosure is not intended be limited to a particular file type or data format. Instead, the term "image" as used in this disclosure may encompass content from any image file type or data format (JPEG, BMP, etc.), any graphically rendered document (e.g., a webpage or HTML document), a computer-aided design (CAD) application, scanned photographs or documents (e.g., in PDF format), or any other type of computer-generated image. Further, the term "modification" as used in this disclosure may, but does not necessarily, refer to a modification of the underlying image data used for rendering the object 210 in the display area.

Figure 3A:
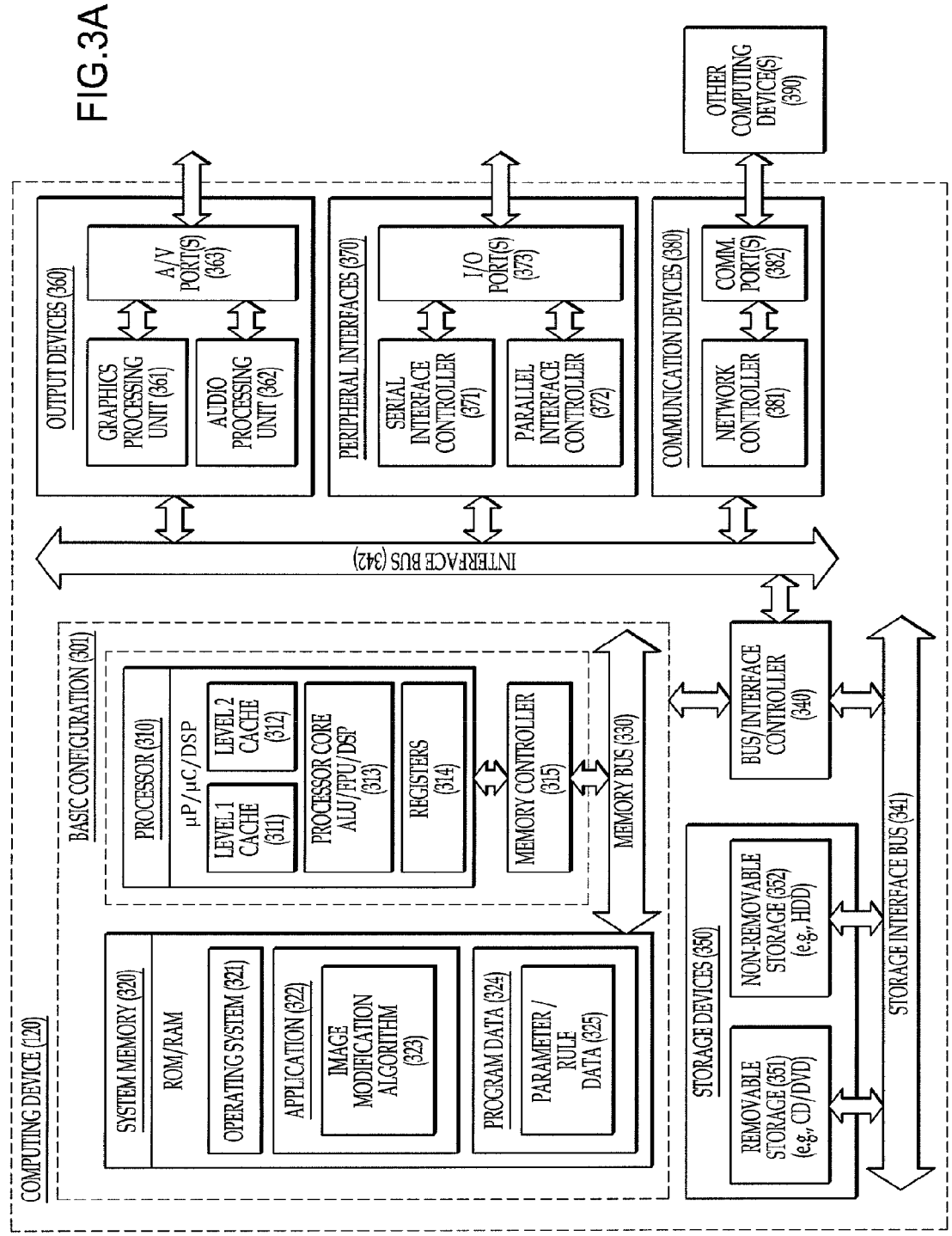
FIG. 3A is a block diagram illustrating an example of a configuration of a computing device arranged to modify a displayed image according to a tracked eye gaze, according to an example embodiment.

FIG. 3A is a block diagram illustrating an example computing device 120 that is arranged for modifying a displayed image according to a tracked eye gaze. In a very basic configuration 301, computing device 120 typically includes one or more processors 310 and system memory 320. A memory bus 330 can be used for communicating between the processor 310 and the system memory 320.

Depending on the desired configuration, processor 310 can be of any type including but not limited to a microprocessor (µP), a microcontroller (µC), a digital signal processor (DSP), or any combination thereof. Processor 310 can include one more levels of caching, such as a level one cache 311 and a level two cache 312, a processor core 313, and registers 314. The processor core 313 can include an arithmetic logic unit (ALU), a floating point unit (FPU), a digital signal processing core (DSP Core), or any combination thereof. A memory controller 315 can also be used with the processor 310, or in some implementations the memory controller 315 can be an internal part of the processor 310.

Depending on the desired configuration, the system memory 320 can be of any type including but not limited to volatile memory (such as RAM), non-volatile memory (such as ROM, flash memory, etc.) or any combination thereof. System memory 320 typically includes an operating system 321, one or more applications 322, and program data 324. Application 322 may include an image modification algorithm 323 that is arranged to process the data points obtained from the eye tracking device 110 and determine an appropriate modification(s) to the image of the displayed object 210. Program data 324 may include data 325 that defines certain variable parameters (e.g., user-defined parameters), and/or certain rules for modifying the image of the object 210. This described basic configuration is illustrated in FIG. 3A by those components within dashed line 301.

Example embodiments relating to the image modification algorithm 323 in the basic configuration 301 will be described in more detail below in connection with FIGS. 4A-4E.

Referring again to FIG. 3A, computing device 120 can have additional features or functionality, and additional interfaces to facilitate communications between the basic configuration 301 and any required devices and interfaces. For example, a bus/interface controller 340 can be used to facilitate communications between the basic configuration 301 and one or more data storage devices 350 via a storage interface bus 341. The data storage devices 350 can be removable storage devices 351, non-removable storage devices 352, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 320, removable storage 351 and non-removable storage 352 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 120. Any such computer storage media can be part of device 120.

Computing device 120 can also include an interface bus 342 for facilitating communication from various interface devices (e.g., output interfaces, peripheral interfaces, and communication interfaces) to the basic configuration 301 via the bus/interface controller 340. Example output devices 360 include a graphics processing unit 361 which may be configured to communicate to the display device 130, and an audio processing unit 362 which may be configured to communicate to speakers, via one or more A/V ports 363. Example peripheral interfaces 370 include a serial interface controller 371 or a parallel interface controller 372, which can be configured to communicate with external devices such as input devices (e.g., keyboard, mouse, pen, voice input device, touch input device, etc.) or other peripheral devices (e.g., printer, scanner, etc.) via one or more I/O ports 373. An example communication device 380 includes a network controller 381, which can be arranged to facilitate communications with one or more other computing devices 390 over a network communication via one or more communication ports 382. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

According to an example embodiment, the eye tracking device 110 may be configured as a peripheral input device of the computing device 120. According to such an embodiment, the computing device 120 may receive the data points from the eye tracking device 110 via the I/O port 373. In an alternative embodiment, the computing device 120 may communicate with the eye tracking device 110 via the communication port 382. Other alternatives for establishing communications between the computing device 120 and the eye tracking device 110 are also possible, e.g., implementing the eye tracking device 110 as one or more functional units within the computing device 120 which communicates with the basic configuration 301 via the interface bus 342.

Computing device 120 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 120 can also be implemented as a personal computer including both laptop computer and non-laptop computer configurations. Furthermore, as described earlier, the computing device 120 may be integrated with, or implemented as a portion of, the eye tracking device 110.

Figure 3B:
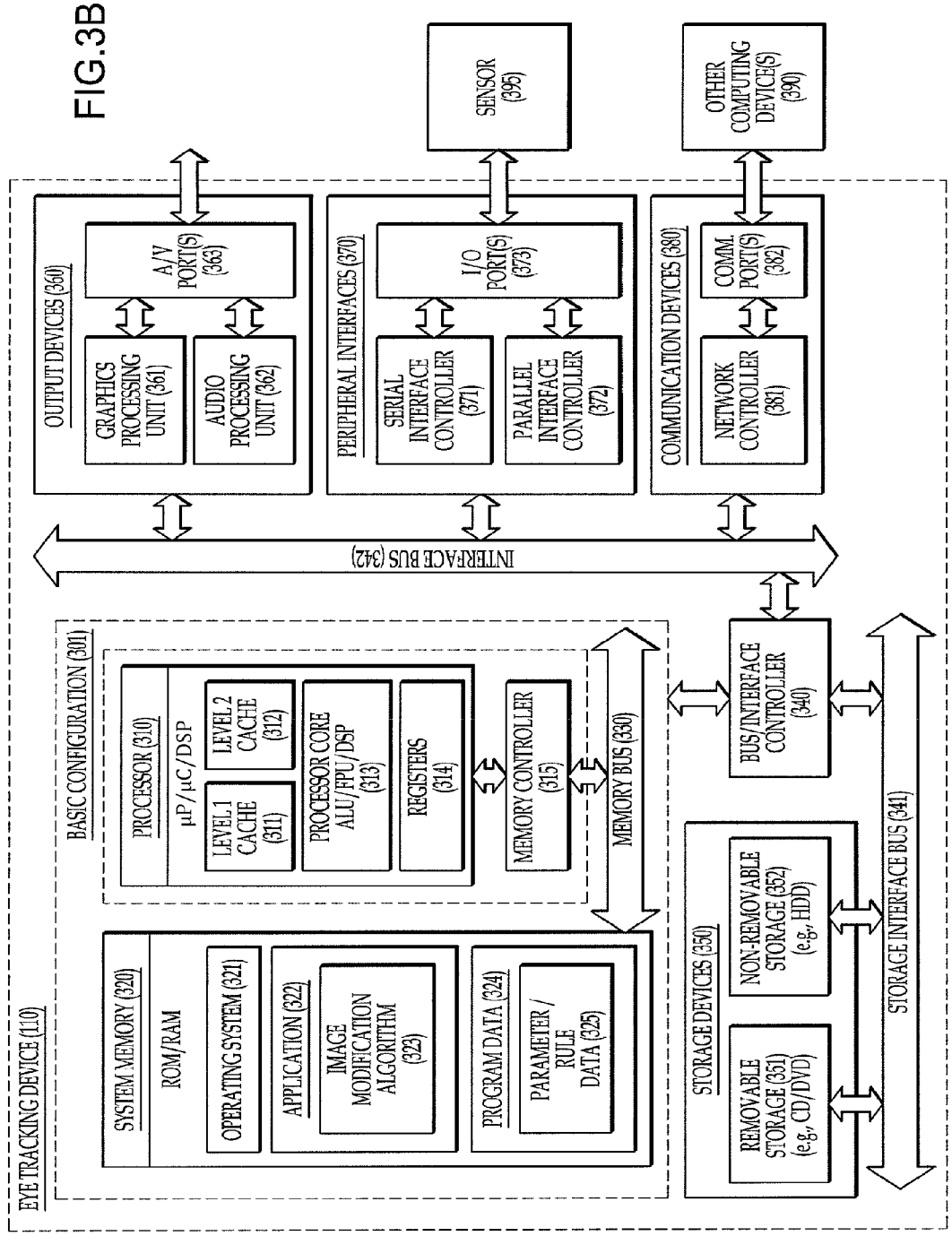
FIG. 3B is a block diagram illustrating an example of a configuration of an eye tracking device arranged to track eye gaze, according to an example embodiment.

According to an example embodiment, the eye tracking device 110 may include processing capabilities with the same or similar configuration as the computing device 120 illustrated in FIG. 3A. This is illustrated in FIG. 3B, in which the eye tracking device 110 has a similar configuration as the computing device 120 of FIG. 3A, the main difference being that the eye tracking device 110 of FIG. 3B also includes a sensor 395 for detecting signals from the viewing environment (e.g., infrared or infrared reflection patterns) indicative of the observer's eye gaze. As shown in FIG. 3B, the sensor 395 may communicate such signals to the processor(s) 310 via the I/O port 373 so that the processor(s) employ the necessary algorithm to transform the detected signals into data points.

FIGS. 4A-4E are flow diagrams illustrating an example of a method for modifying an image of an object 210 based on a tracked eye gaze. According to an example embodiment, the process described in flow diagrams of FIGS. 4A-4E may correspond to the image processing algorithm 323 of application 322 implemented within the computing device 120. However, it is also possible for any processor(s) within the eye tracking device 110 to be configured to perform at least some of the steps or processes illustrated in these flow diagrams.

Figure 4A:
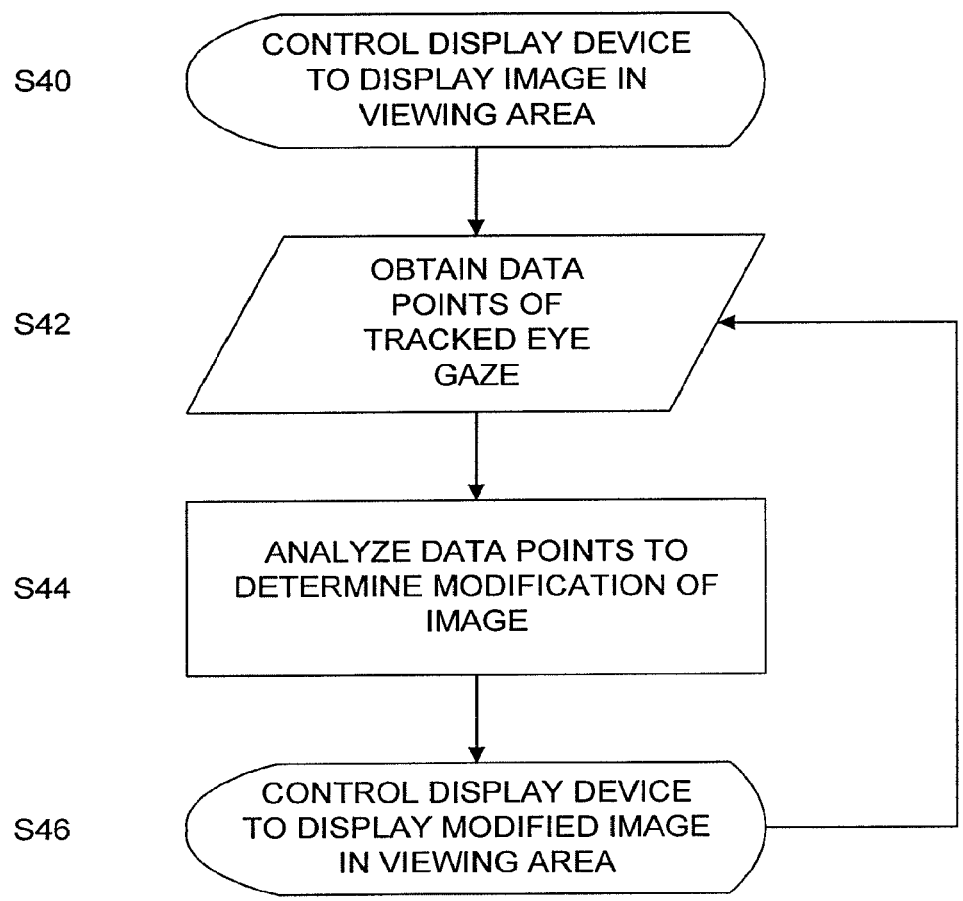
FIGS. 4A-4E are flow diagrams illustrating a method for modifying a displayed image based on a tracked eye gaze, according to an example embodiment.

FIG. 4A illustrates a high level flow diagram of the method for modifying the image of the object 210, according to an example embodiment. As shown in step S40, the display device 130 is initially controlled to display an image of the object 210 in the viewing area 220. In this step, an arbitrary view of the object 210 may be selected for display. Alternatively, the view of the object 210 initially displayed in step S40 may be automatically selected based on an existing technique.

For example, if the object 210 is defined geometrically in a three-dimensional space, the mesh saliency method may be used to select the initial view of the object 210 in step S40. This method is described in Lee et al., "Mesh Saliency," ACM Transactions on Graphics, Proceedings of ACM SIGGRAPH 2006, pp. 659-666, the contents of which are incorporated herein by reference. In particular, the mesh saliency method would determine a measure of importance or saliency for the various regions of a three-dimensional mesh of the object 210, based on the geometry (particularly curvature) of the object 210. According to this method, a region which is geometrically different from its surrounding regions would be considered to have a higher saliency or interest to the viewer than a region which is geometrically similar to its surroundings. According to the mesh saliency method, the saliencies defined for the different regions can be used to calculate saliency values for various possible viewpoints of the object 210, such that the viewpoint with the maximum saliency value would be considered an "optimal" viewpoint for displaying the object 210.

However, other processes for establishing the initial viewpoint of a three-dimensional object 210 may be used, including the viewpoint entropy method.

Furthermore, even if the object 210 is defined as a two-dimensional image, there are known methods for calculating saliencies of the regions of such an object based on the colors and/or intensities of the various regions. The most salient region of a two-dimensional object 210 may be emphasized in the initial rendering of step S40 by choosing an appropriate spatial positioning (e.g., center of the viewing area 220) and magnification level.

Referring again to FIG. 4A, after the image of the object 210 is initially displayed, step S42 obtains data points of the tracked eye gaze from the eye tracking device 110. As described above, the eye tracking device 110 may be configured to calculate these data points as coordinates of the gaze locations (e.g., x and y coordinates) of the observer's eyes 200 with respect to the viewing area 220. The eye tracking device 110 may track the eye movements according to a predetermined sampling rate, in order to record a data point for each sampling interval. For instance, at each sampling interval, the eye tracker device 110 may detect a gaze direction of the observer's eyes 200 and perform any necessary computations to translate the gaze direction to a corresponding gaze point on the viewing area 220 of the display device 130.

However, it should be noted that the eye tracking device 110 might not always be able to obtain a usable data point during each sampling interval. For example, the observer's eyes 200 may either be blinking or looking away from the viewing area 220 during certain sampling intervals. According to an example embodiment, either the eye tracking device 110 or the computing device 120 may include some functionality to filter out the unusable or insignificant data points.

As previously described in this disclosure, the viewing area 220 of the display device 130 may represent a two-dimensional plane for viewing the image of the object 210. Accordingly, each data point obtained by the eye tracking device 110 could comprise Cartesian x and y coordinates representing a particular point in the two-dimensional plane. However, the format of the data points is not important. For instance, the data points may correspond to a different coordinate system (e.g., polar coordinates), or utilize some other convention for identifying specific locations or pixel positions within the viewing area 220.

Referring again to FIG. 4A, step S44 analyzes the data points obtained by the eye tracking device 110 in order to determine a modification of the displayed image of the object 210. Specifically, the data points are analyzed in order to determine on which region of the viewing area 220 or, particularly, the object 210 displayed therein, the observer has focused his/her gaze. Such information can be used to determine which part of the displayed object 210 is receiving most of the observer's attention, so that the image can be modified to more clearly show that part. Further, the observer's intent in manipulating or controlling the image may be inferred from the location on the viewing area 220 where the observer has focused his/her gaze.

According to an example embodiment, step S44 may be performed by applying various rules to the obtained data points in order to determine which aspects of the current view of the object 210 (e.g., the viewing direction, the angle of view, or the spatial position within viewing area 220) should be modified. For instance, such rules may be programmed into the application 322, as part of the image modification algorithm 323, illustrated in FIG. 3A. Alternatively, program data 324 may include data 325 defining such rules, thereby allowing the rules to be changed without having to modify the application program 322.

A more detailed description of examples of processes for analyzing the data points and determining the modification, in accordance with step S44, will be described below in connection with FIGS. 4B-4E.

Referring again to FIG. 4A, step S46 controls the display device 130 to replace the currently displayed image of the object 210 with an image modified in accordance with determination made in step S44. Thereafter, processing may return to step S42 in order to track the observer's gaze with respect to the modified image, and determine any further modifications to the image based on the tracked eye gaze. It should be noted that the execution of step S44 may not always result in a determination that the image should be modified. In such instances, step S46 may simply cause the display device 130 to continue displaying the same image before returning processing to step S42.

According to one example embodiment, steps S42-S46 of FIG. 4A may be repeated in cycles of a predetermined period of time (or a predetermined number of sampling intervals). In other words, during each cycle (e.g., every two seconds), a new set of data points are analyzed in order to determine whether, and what type of, modification should be made to the displayed image. Further, an observer might be able to input a parameter into the computing device 120, via any of various types of input devices (e.g., computer keyboard, electronic mouse, or voice/gaze activated controls), in order to define the period of time of each cycle.

However, according to an alternative example embodiment, the data points of the tracked eye gaze may be analyzed according to a "moving window" spanning a predetermined period of time. For example, as each data point is obtained from the eye tracking device 110, step S44 may analyze the data points obtained for the last n sampling intervals (n being equal to the number of sampling intervals which occur during the predetermined period of time) in order to determine whether, and what type of, modification should be made to the image. Also, it is possible to allow the observer to define the period of time corresponding to the moving window, e.g., by inputting such parameter into the computing device 120 via an input device.

Furthermore, the data points may be analyzed according to different predetermined periods of time to effect different types of image modifications, respectively. For instance, in order to effect a zoom-in of the image, the observer may be required to focus his/her gaze at a particular location of the viewing area 220 for a longer period of time than is necessary for effecting displacement of the object 210. Moreover, it is contemplated that the observer may define such periods of time by inputting one or more parameters defining such period(s) of time into the computing device 120.

Figure 4B:
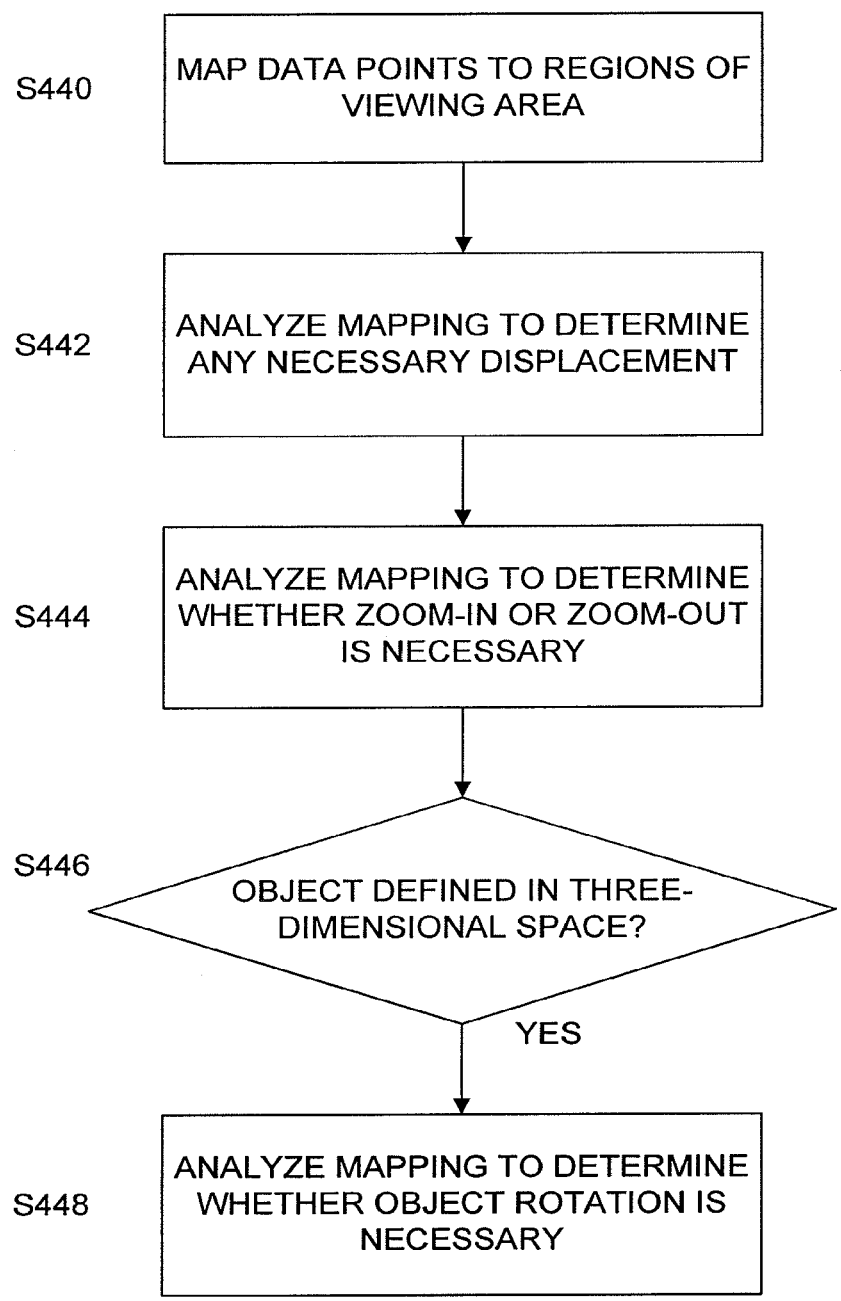

FIG. 4B is a flow diagram illustrating an algorithm to implement the step S44 in FIG. 4A of analyzing the data points to determine the modification of the image. It should be noted that FIG. 4B is merely illustrative of an example embodiment, and not intended to be limiting. It is not necessary for the particular order of steps to be followed. Also, it is not necessary for all of the steps in FIG. 4B to be performed. For example, any of steps S442, S444, and S448 may be omitted if it is not desired to implement the corresponding type of image modification (displacement, zooming, or rotation).

According to FIG. 4B, step S440 maps the data points obtained from the eye tracking device 110, for a particular period of time, to a set of defined regions in the viewing area 220 of the display device 130. The regions of the viewing area 220 may be defined according to any level of granularity starting from individual pixel positions. Furthermore, these regions may be dependent on the particular object 210 which is displayed. For instance, each region of the viewing area 220 defined in the mapping may correspond to a particular feature of the object 210.

Referring again to FIG. 4B, step S442 analyzes the mapping of data points to determine whether the current image should be modified by moving or displacing the object 210 displayed therein. Step S444 analyzes the mapping in order to determine whether the image should be modified by performing either a zoom-in or zoom-out operation. Further, if the object 210 is defined geometrically in a three-dimensional space (step S446), step S448 analyzes the mapping to determine whether the object 210 should be rotated.

Figure 4C:
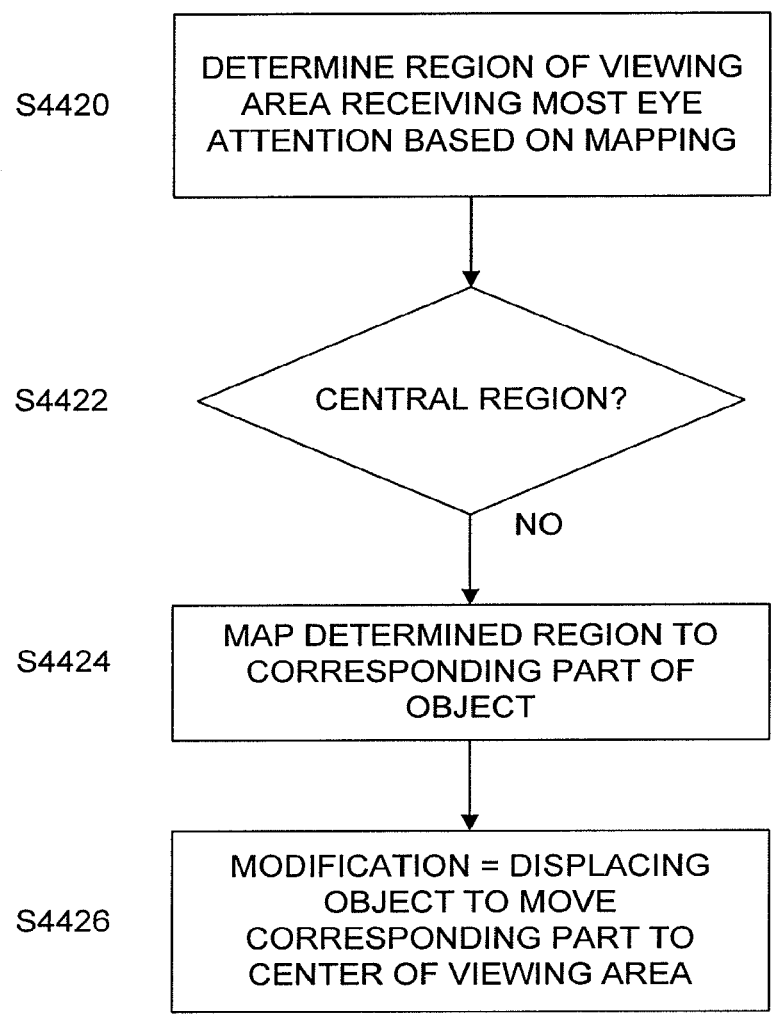

FIG. 4C is a flow diagram illustrating an example of a process for implementing the analysis of step S442 in FIG. 4B. Particularly, this process may apply the following example of a rule for determining whether the current image should be modified by displacing the object: if the mapping of the data points indicates that the observer is most interested in a particular part of the object 210 in the image, which is not already at the center of the viewing area 220, the image should be modified by moving that part of the object 210 to the center of the viewing area 220.

Referring to FIG. 4C, step S4420 determines the region of the viewing area 220 receiving the highest degree of eye attention based on the mapping, i.e., the region to which the most of the data points are mapped. For instance, step S4420 may simply select the region where a majority of data points are mapped. Alternatively, step S4420 may apply additional criteria in making this determination, e.g., by requiring a certain number or percentage of the data points be mapped to the region.

In step S4422 of FIG. 4C, a decision is made as to whether the determined region is already at the center of the viewing area 220. If the answer is "yes," it is determined not necessary to modify the image by displacing the object 210, as the part of the object 210 of interest to the observer is at the center of the viewing area 220. However, if the answer is "no," the process proceeds to step S4424 where the determined region of the viewing area is mapped to a corresponding part of the object 210 (i.e., the part of interest to the observer). Accordingly, step S4426 determines that the image modification should include moving the image so that the corresponding part of the object 210 is moved to the center of the viewing area.

Figure 5A:
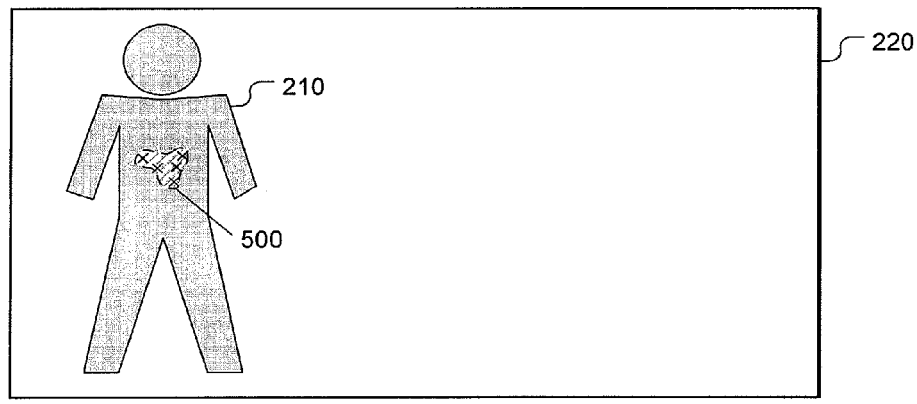
FIGS. 5A and 5B illustrate examples of modifications to the spatial position of a displayed object.
Figure 5A:
Figure 5A:
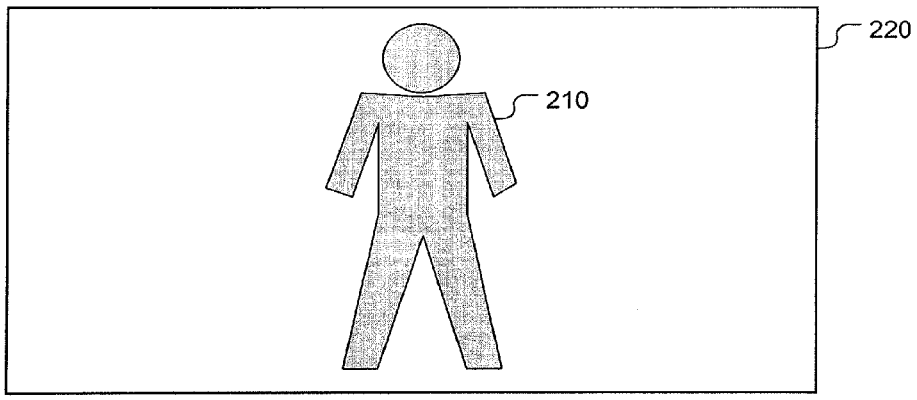
Figure 5B:
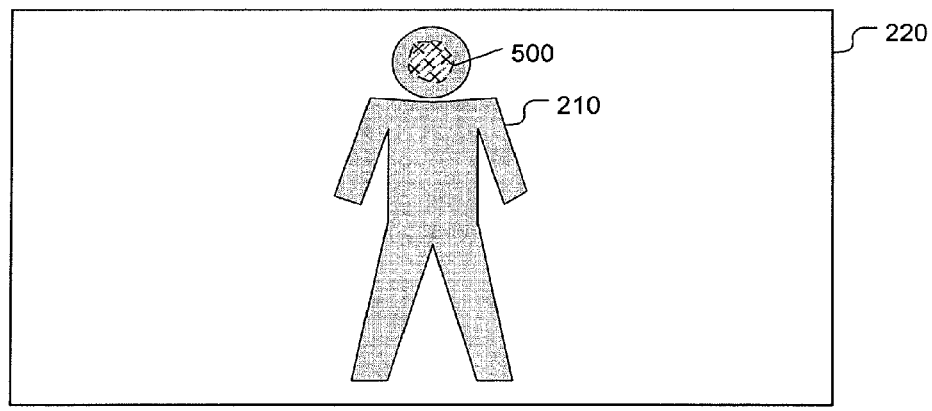
Figure 5B:
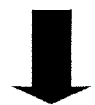
Figure 5B:
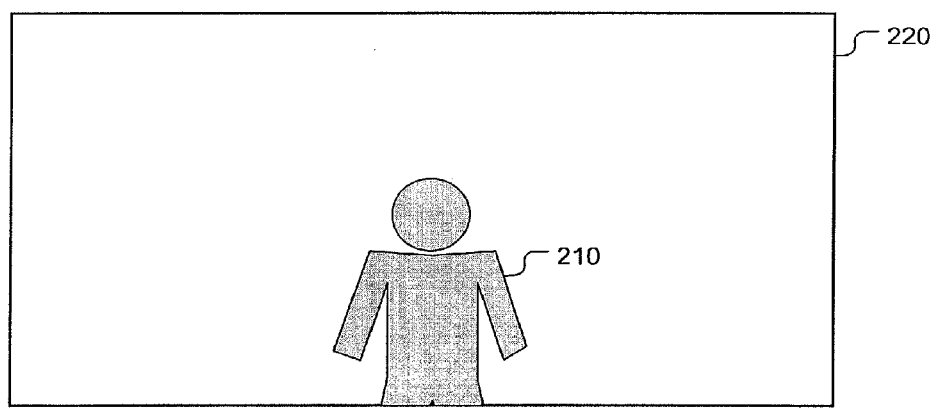

FIGS. 5A and 5B illustrate examples of modifying the spatial position of the displayed object 210, with respect to the viewing area 220, in accordance with the process of FIG. 4C. In FIGS. 5A and 5B, a person is illustrated as the object 210 displayed in the viewing area 220.

According to the example of FIG. 5A, the observer's gaze is concentrated at area 500 (at the person's torso) for a particular period of time. Accordingly, the various "x" symbols illustrate the mapping of data points to the corresponding region of the viewing area 220 (note, FIG. 5A is a simplified example, and does not necessarily represent the number of data points which would be mapped in actual implementation). Accordingly, FIG. 5A shows that the determination is made to modify the image so that the torso of the person 210 is moved to the center of the viewing area.

As to the example of FIG. 5B, this shows that the person 210 is already displayed in the viewing area 220 such that the torso is situated in the center. However, FIG. 5B shows that the gaze of the observer's eyes 200 is concentrated in an area 500 in the person's 210 head. Thus, it can be determined that the head is the part of the person 210 of most interest to the observer based on the mapping of data points ("x"). Accordingly, FIG. 5B shows that the spatial position of the person 210 is modified by moving the head to the center of the viewing area 220.

Figure 4D:
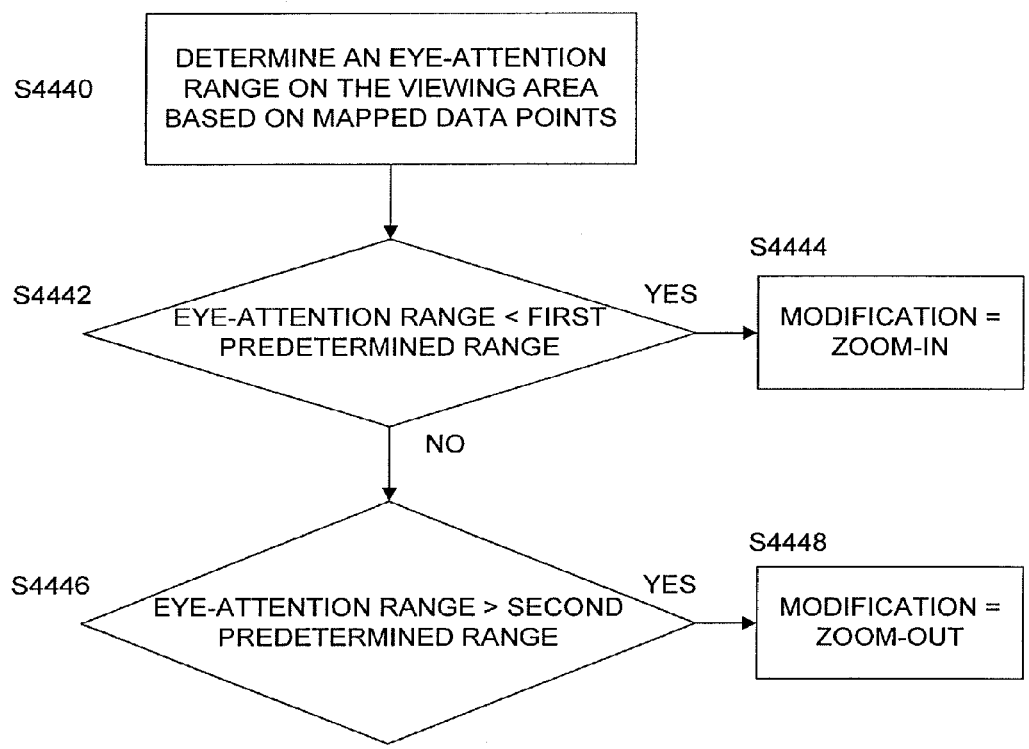

FIG. 4D is a flow diagram illustrating an example of a process for implementing the analysis of step S444 in FIG. 4B. In particular, this process applies rules indicating that the zoom-in and zoom-out modifications are effected depending on the range of the viewing area 220 receiving the observer's eye attention during a predetermined period of time.

According to these rules, a large range (e.g., wide scattering of gaze locations) would result in a zoom-out. Conversely, a small range (all or most of the gaze locations being very close to each other) would result in zoom-in.

Referring to FIG. 4D, step S4440 determines an eye-attention range on the viewing area 220 based on the mapping of data points. This step may analyze a series of data points which were sampled over a predetermined period of time (e.g., two seconds). Based on this analysis, the eye-attention range may be determined as the range of the viewing area 220 to which a predetermined concentration of the data points were mapped. This predetermined concentration may be defined as a certain percentage of the usable data points sampled by the eye tracking device 110 during the period of time, or simply as a particular number of data points.

According to step S4442 of FIG. 4D, a decision is made as to whether the eye-attention range is smaller than first predetermined range. If the answer is "yes," it is determined that the observer's intent is to zoom-in on the object 210 and, thus, the image should be modified by performing a zoom-in operation according to step S4444.

Such zoom-in may be focused to the area 500 of the object 210 receiving the highest degree of eye-attention based on the mapping of data points. Alternatively, the zoom-in may be focused on the center of the image, especially if the process of FIG. 4C has already moved the area 500 to the center of the viewing area 220. As such, the zoom-in operation may result in a magnification of the displayed object 210.

Referring again to FIG. 4D, if step S4442 determines that the eye-attention range is not smaller than the first predetermined range, step S4446 decides whether the eye-attention range is larger than a second predetermined range. If the answer is "yes," it is determined that the observer's intent is to see a wider view of the object 210 and, thus, a zoom-out operation is performed on the image according to step S4448. This zoom-out may result in a shrinking of the displayed object 210. Conversely, if step S4446 decides that the eye-attention range is not larger than the second predetermined range, it is determined that neither zoom-in nor zoom-out is needed.

It should be noted that the order of steps S4442-S4448 in FIG. 4D is not important. The process may be modified to change the order of these steps, e.g., to determine whether to zoom-out before determining whether to zoom-in. Also, it is not necessary to make determinations with regard to both the zoom-in and zoom-out. For example, if only the zoom-in functionality is to be provided to the observer, FIG. 4D could be modified to omit steps S4446 and S4448. Conversely, if only the zoom-out functionality is to be provided, steps S4442 and S4444 may be omitted.

Furthermore, according to an example embodiment, the first predetermined range and/or second predetermined range employed for the zooming purpose can be defined by the observer via an input device. However, according to an alternative embodiment, the first and second predetermined ranges can be defined either according to angle of view or height/width parameters.

Consider first the example embodiment where the first and second predetermined ranges are defined as predetermined angles of view, respectively. In such an embodiment, before the comparisons of steps S4442 and S4446 are made, the eye-attention range may be translated into a corresponding angle of view, assuming that the distance between the observer's eyes 200 and the viewing area 220 is known. Such distance may be determinable, e.g., by an image processing technique employed in the eye tracking device 110. Furthermore, the angles of view corresponding to the first and second predetermined ranges may be established relative to the observer's angle of view corresponding to the entire viewing area 220.

A specific example of this embodiment is as follows. If the observer's angle of view of the whole viewing area 220 is 30 degrees, the process of FIG. 4D may determine that a zoom-in operation is to be carried out when the user narrows his/her eye-attention range to an angle of view of 5 degrees or less for a span of 2 seconds. Alternatively, the process may determine that a zoom-out operation should be carried out when the observer's eye-attention range has increased to an angle of view larger than 25 degrees for a span of 2 seconds.

Consider now the alternative example embodiment where the first and second predetermined ranges are defined according to respective sets of height and width parameters. As such, the eye-attention range may also be translated into corresponding lengths in the vertical and horizontal direction before performing the comparisons of steps S4442 and S4446 in FIG. 4D. Also, each of steps S4442 and S4446 may be designed to compare the maximum length (vertical or horizontal) of the eye-attention span to the corresponding height or width parameter of the predetermined range. For example, if the horizontal length of the eye-attention range is longer than the vertical length, then the horizontal length would be compared to the width parameters of the first and second predetermined ranges, respectively. Conversely, if the vertical length of the eye-attention range is longer than the horizontal length, the vertical length would be compared to the height parameters of the first and second predetermined ranges, respectively. Furthermore, in this embodiment, the height and width parameters of each of the first and second predetermined ranges could be established relative to the height and width of the entire viewing area 220 of the display device 130.

A specific example of this alternative embodiment is as follows. The process of FIG. 4D may determine that a zoom-in operation should be carried out when the maximum length (vertical or horizontal) of the observer's eye-attention range is shorter than 1/6 of the corresponding height/width parameter of the viewing area 220 for a span of 2 seconds. Alternatively, the process may determine that a zoom-out operation is to be carried out when the maximum length (vertical or horizontal) of the user's eye-attention range is longer than 2/3 of the corresponding side length of the screen for a span of 2 seconds.

In the process FIG. 4D, any of the following parameters may be set by the observer through the use of an input device: the period of time to measure the observer's eye-attention range, the zooming ratio for the zoom-in and zoom-out operations, and any of the threshold parameters corresponding to the first and second predetermined ranges. Alternatively any or all of the aforementioned parameters may be automatically determined, e.g., by a training process implemented in the computing device 120.

Figure 6A:
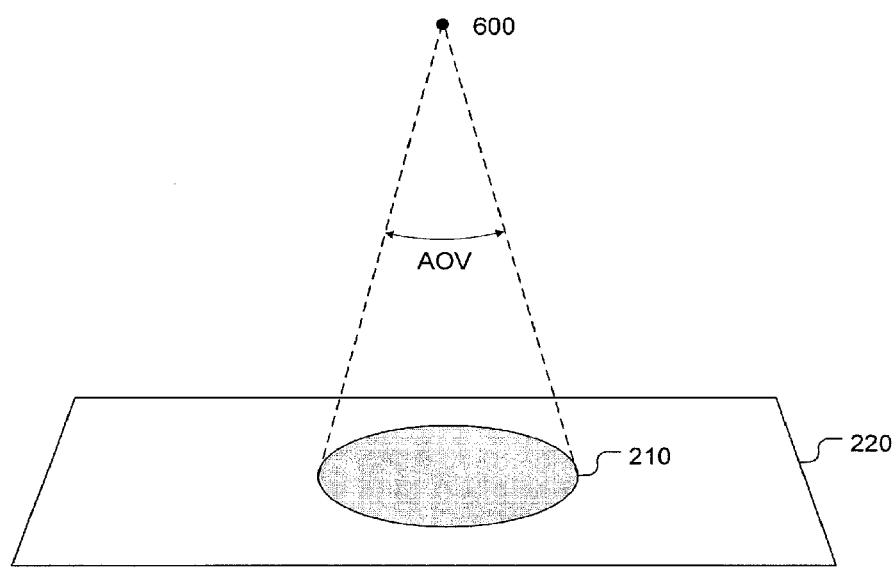
FIGS. 6A-6D illustrate examples of modifications to the angle of view of a displayed object.
Figure 6B:
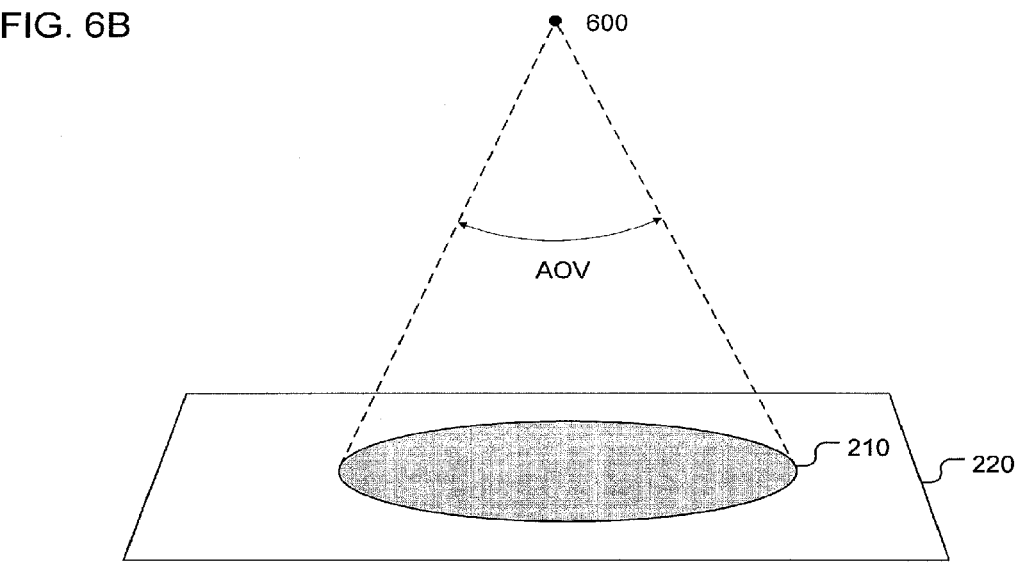

FIGS. 6A and 6B illustrate examples of how the observer's angle of view of the displayed object 210 might be modified in accordance with zooming operations carried out in the process of FIG. 4C. Particularly, in FIGS. 6A and 6B, the origin points of the observer's eye gaze is illustrated as point 600 (this is a simplification, since the gaze of each eye 200 originates at a slightly different point). As shown in these figures, the angle of view ("AOV") is based on the magnification (zoom) level of the object 210 (illustrated as a circle or sphere). In comparison, FIGS. 6A and 6B show that a smaller magnification (zoom) level on the object 210 results in a smaller angle of view ("AOV") than a larger magnification (zoom) level. Thus, it is clear that shrinking or magnifying the object 210 in the image according to a zoom operation results in a modified angle of view for that object 210.

Figure 6C:
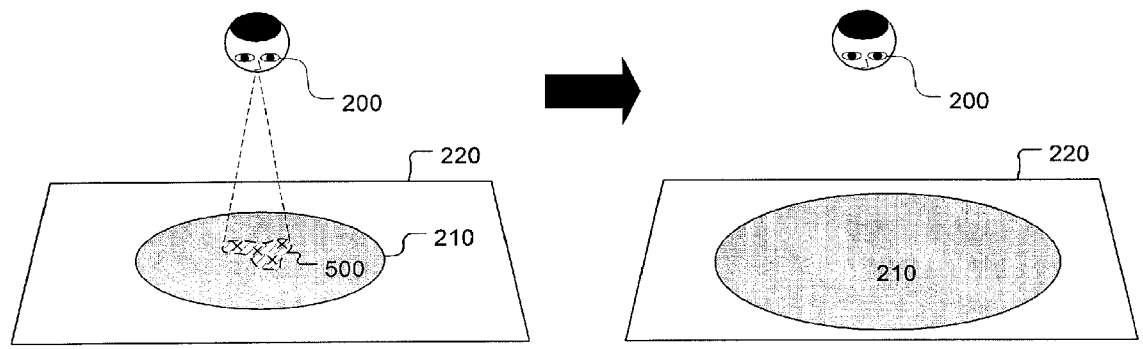

FIG. 6C illustrates an example of modifying the image according to the zoom-in operation, as determined by the process of FIG. 4D. In the example of FIG. 6C, the data points of the tracked eye gaze, for a predetermined length of time, are concentrated in area 500 on the object 210. The dotted lines show the determined eye-attention range of the observer, defined as an angle of view. FIG. 6C shows that this eye-attention range is smaller than the first predetermined range of FIG. 4D, resulting in a zoom-in of the image.

Figure 6D:
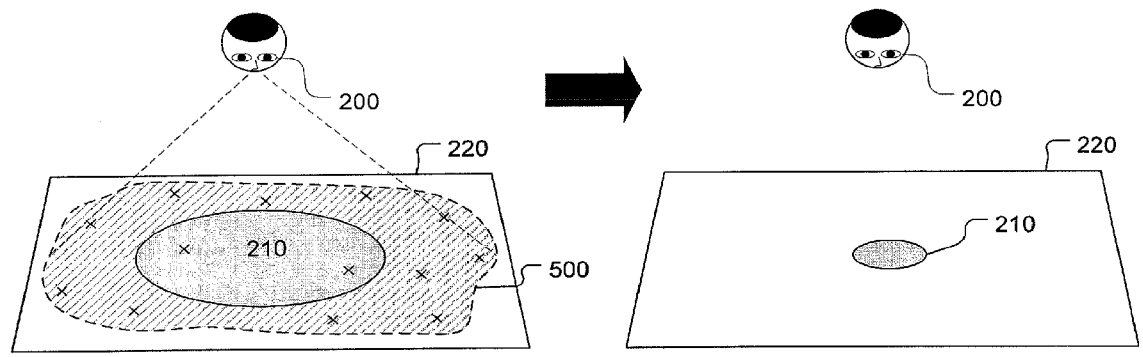

FIG. 6D illustrates an example of modifying the image according to a zoom-out operation, as determined by the process of FIG. 4D. In FIG. 6D, the data points of the tracked eye gaze, for a predetermined length of time, are scattered across the viewing area 220 in area 500. The dotted lines of this figure show the eye-attention range defined as an angle of view. FIG. 6D shows that the eye-attention range is larger than the second predetermined range of FIG. 4D, resulting in a zoom-out of the image.

Figure 4E:
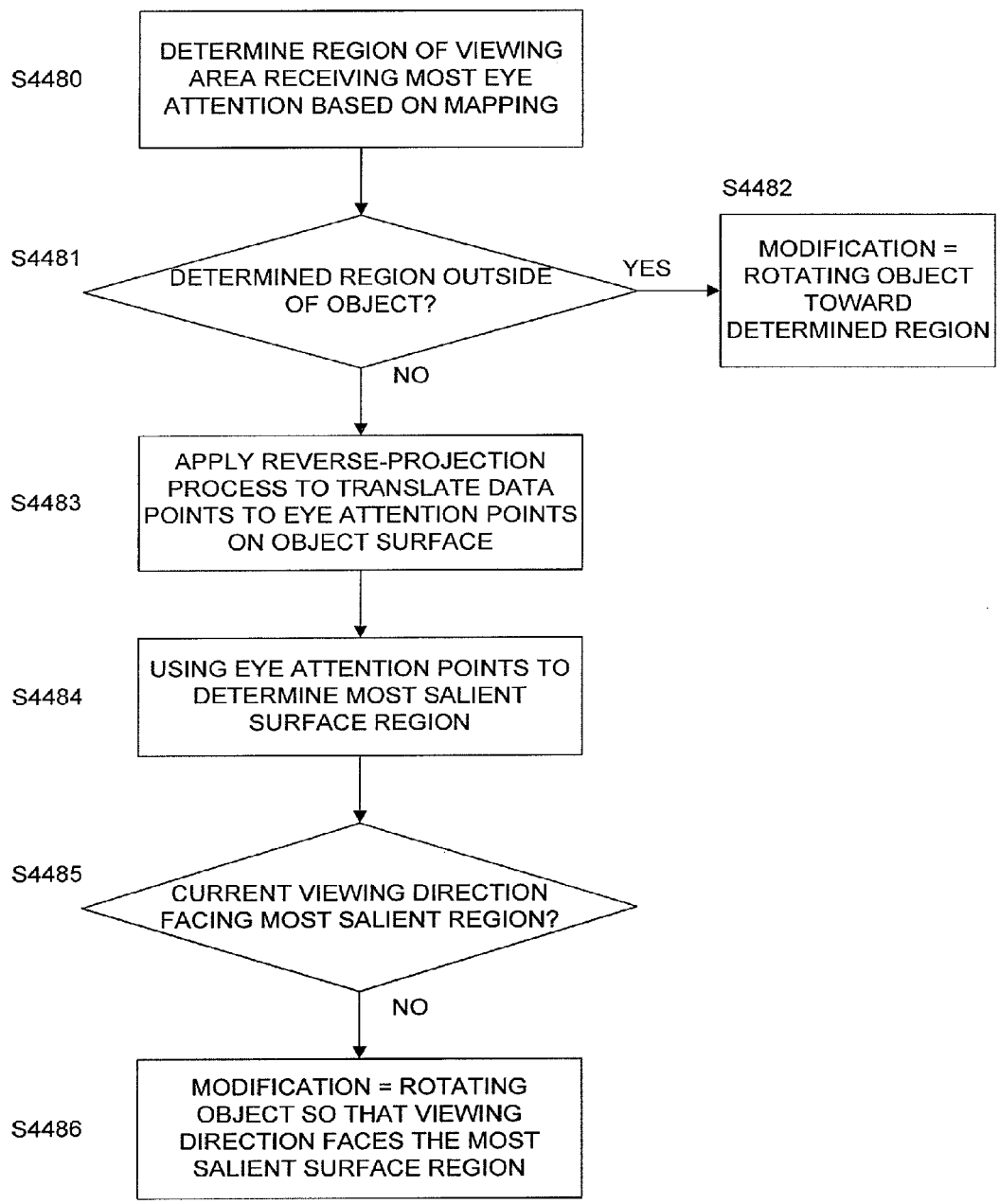

FIG. 4E is a flow diagram illustrating an example of a process for implementing the analysis of step S448 in FIG. 4B. This process of FIG. 4E is applicable when the surface of the object 210 is defined geometrically in a three-dimensional coordinate space (e.g., according to x, y, and z axes) and, thus, can be displayed according to different viewing directions. For example, the computing device 120 may be controlling the display device 130 to display a three-dimensional model of the object 210 (or a three-dimensional model of which the object 210 is a part).

In particular, the process of FIG. 4E defines rules for determining modifications to the current image by changing the viewing direction of (i.e., by rotating) the displayed object 210. Please note that FIG. 4E is not intended to be limiting. Accordingly, the order of the various steps therein may be changed, and some of steps may be omitted, to implement the desired rules for rotating the object 210.

Referring to FIG. 4E, step S4480 determines which region of the viewing area 220 receives the highest degree of eye-attention, for a certain length of time, based on the mapping of the data points in step S440 of FIG. 4B. Particularly, step S4480 may select the region in the viewing area 220 in which the majority of data points are mapped, as the determined region. Then, step S4481 decides whether the determined region is outside of the borders of the displayed object 210. If the answer is "yes," step S4482 indicates that the image should be modified by rotating the object 210 toward the determined region.

Thus, as a rule, when the observer gazes at one location on the border of the viewing area 220 for a predetermined length of time, this is interpreted by the process of FIG. 4E as the observer's intent to rotate the object 210 in a corresponding direction.

Referring again to FIG. 4E, step S4483 utilizes an unprojection process to translate the mapped data points to the three-dimensional space in which the object surface is defined. Basically, each data point defines a viewing ray from the observer's eyes 220 to the viewing area 220. The unprojection process of step S4483 computes the interception of such a viewing ray with the surface of the object 210 defined in the three-dimensional space. This can be accomplished by multiplying the x, y coordinates of each data point with an unprojection matrix, resulting in the x, y, z coordinates of a corresponding point on the three-dimensional surface of the object 210. For example, the unprojection matrix may be calculated as an inverse of the projection matrix used for rendering the three-dimensional surface of the object 210 on the two-dimensional image plane (screen) of the display device 130. It is further noted that the Open Graphics Library (OpenGL) provides a function for applying an unprojection process directly on a two-dimensional data point.

Accordingly, in step S4483, a set of data points are translated into a set of eye attention points on the three-dimensional surface of the object. These eye attention points may be used to determine which region of the object surface is of the most interest to the observer, as will be discussed in more detail below.

According to an example embodiment, the eye tracking device 110 may be configured to apply the unprojection process of step S4483 to the sampled data points, and transmit the resultant eye attention points to the computing device 120 for further determination as to how to modify the image. However, in an alternative embodiment, however, the computing device 120 may be programmed to carry out the unprojection process on the data points received from the eye tracking device 110.

Referring again to FIG. 4E, step S4484 uses the eye attention points to determine which of a plurality of defined regions of the three-dimensional object surface has a highest degree of saliency or importance.

The surface of the object 210 may divided into regions based on the geometry of the surface. For instance, where the object 210 is defined in the three-dimensional space according to a polygon mesh, the surface regions may be defined according to the faces of such a mesh. However, the surface regions need not be defined based on such a mesh. The surface may be regionalized based on the perceptually important features of the object 210 and/or other criteria.

According to an example embodiment, step S4484 may determine the most salient surface region simply by mapping the eye attention points to their corresponding surface regions, and selecting the surface region with the highest number of eye attention points.

In an alternative embodiment, other factors relating to saliency may be combined with the mapped eye attention points to determine the most salient surface region. For instance, each surface region may be preliminarily assigned saliency values based on the mesh saliency method described in Lee et al., "Mesh Saliency," ACM Transactions on Graphics, Proceedings of ACM SIGGRAPH 2006, pp. 659-666, the contents of which are incorporated herein by reference. The mesh saliency method calculates saliency for various regions of a three-dimensional mesh based on their relative geometry (in particular, curvature). Using the mesh saliency method, a surface region of the object 210 that is geometrically unique from its surrounding regions would be assigned a higher preliminary saliency value than would surface regions that are similar geometrically to their surrounding regions. These preliminary saliency values could then be combined with "weights" assigned to the respective surface regions based on the number of eye attention points mapped therein. Particularly, each surface region may be assigned a weight between 0 and 1, whereby a surface region with a higher number of eye attention points has a weight closer to 1, while a surface region with a lower number of eye attention points has a weight closer to 0. For each surface region, the assigned weight and preliminary saliency value may be multiplied. Then, the surface region corresponding to the highest multiplication result can be selected as the most salient surface region of the object 210.

Of course, the eye attention points may be combined with other parameters, or used in other ways, to determine a most salient surface region of the object 210, in accordance with step S4484.

Referring again to FIG. 4E, in step S4485, a decision is made as to whether the current viewing direction of the image is already facing the most salient region as determined in step S4484. If not, step S4486 determines that the current image is to be modified by rotating the object 210 so that its viewing direction faces the surface region determined to be most salient. As such, the viewing direction of the object 210 is modified to provide a better view of the most salient surface region.

Figure 7A:
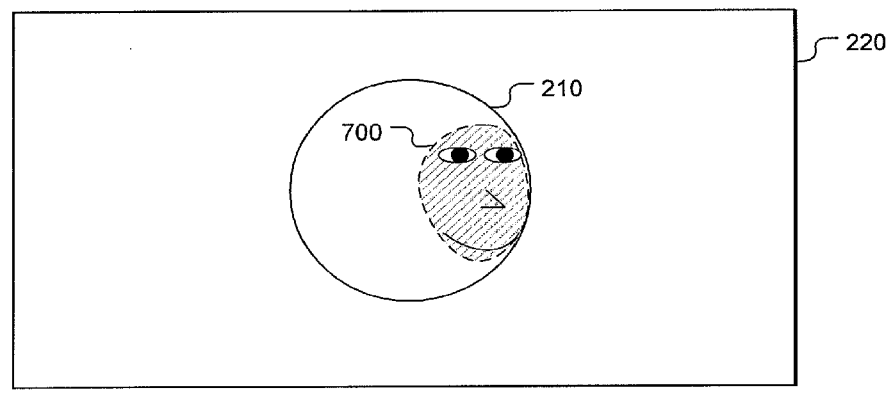
FIGS. 7A and 7B illustrate examples of modifications to the viewing direction of an object whose surface is defined in a three-dimensional space.
Figure 7A:
Figure 7A:
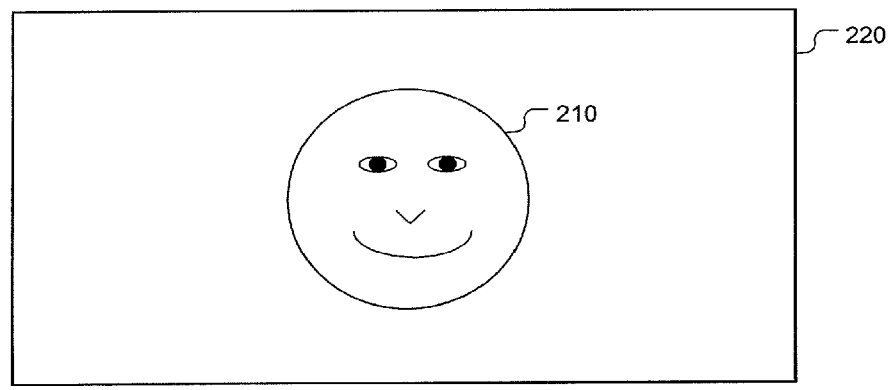
Figure 7B:
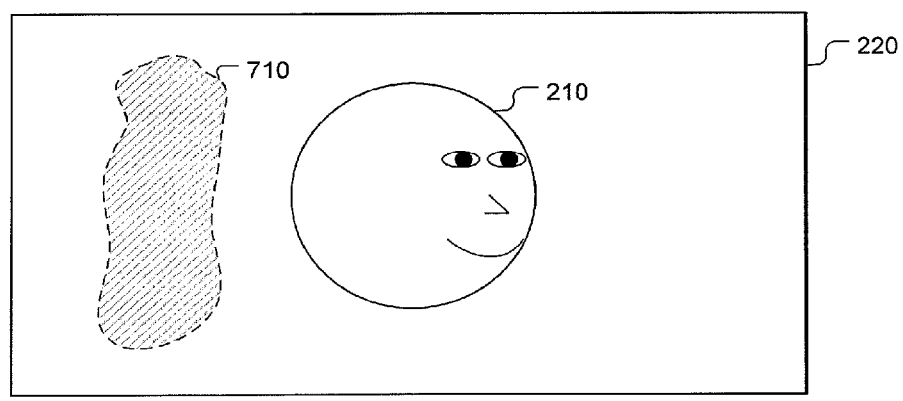
Figure 7B:
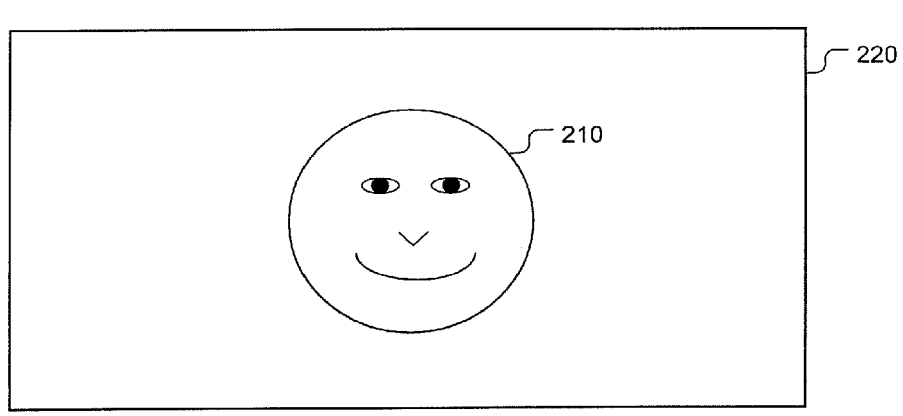

FIGS. 7A and 7B illustrate examples of modifying the viewing direction of an object according to the process of FIG. 4E. In FIGS. 7A and 7B, a person's head is illustrated as the object 210 displayed in the viewing area 220.

Particularly, FIG. 7A illustrates the situation where surface region 700, which corresponds to the person's face, is determined to be the most salient surface region of the person's head 210. Thus, the image is modified by rotating the person's head 210 so that the viewing direction is directly toward the person's face, in accordance with step S4485 of FIG. 4E.

As to FIG. 7B, this illustrates a situation where the observer has focused his/her gaze toward a region 710 of the viewing area 220 bordering the person's head 210 on the left-hand side. Accordingly, the image is modified by rotating the person's head 210 toward the left, thus changing the viewing direction in accordance with step S4482 of FIG. 4E. As shown in FIG. 7B, this functionality could also used to modify the viewing direction to face a more salient surface region, as similarly shown in FIG. 7A.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
    obtaining a data point of a tracked eye gaze at a predetermined sampling interval of a displayed image of an object in a viewing area, the data point representing a detected location of the tracked eye gaze within the viewing area;
    determining a range of the viewing area in which the data point is located;
    magnifying the displayed image when the determined range is smaller than a first predetermined range; and
    shrinking the displayed image when the determined range is larger than a second predetermined range.

2. The method of claim 1, further comprising analyzing the data point to identify a region of the displayed image corresponding to a high degree of eye attentiveness based on the tracked eye gaze.

3. The method of claim 2, further comprising modifying the displayed image by moving the object to thereby move the identified region of the object to a different location of the viewing area in the modified displayed image.

4. The method of claim 3, wherein the modifying includes moving the identified region of the object to the center of the viewing area.

5. The method of claim 1, wherein the first and second predetermined ranges include predetermined viewing angles.

6. The method of claim 5, further comprising computing a viewing angle of the viewing area based on the tracked eye gaze.

7. The method of claim 6, further comprising establishing the first and second predetermined ranges relative to the computed viewing angle of the entire viewing area.

8. The method of claim 1, wherein the first predetermined range is defined according to a first set of height and width parameters and the second predetermined range is defined according to a second set of height and width parameters.

9. A method, comprising:
    obtaining a data point of a tracked eye gaze at a predetermined sampling interval of a displayed three-dimensional image of an object in a viewing area, the data point representing a detected location of the tracked eye gaze within the viewing area;
    identifying eye attentiveness points on a surface of the displayed three-dimensional image by applying an unprojection process to translate the obtained data point to a point on the displayed three-dimensional image; and
    modifying the displayed three-dimensional image based on the identified eye attentiveness points.

10. The method of claim 9, further comprising mapping the identified eye attentiveness points to a plurality of surface regions of the displayed three-dimensional image.

11. The method of claim 10, further comprising determining a surface region of the plurality of surface regions with a highest degree of saliency based on the mapping.

12. The method of claim 10, further comprising modifying the displayed three-dimensional image by rotating the object so that, in the modified displayed three-dimensional image, the viewing direction of the object faces the determined surface region.

13. The method of claim 9, wherein the unprojection process is applied by multiplying an unprojection matrix with coordinates of a gaze location, the unprojection matrix is calculated based on a projection matrix used for projecting the surface of the object onto the viewing area.

14. A computing device having one or more computer processors that store executable instructions, operably connected to a display device, that when executed cause the one or more computer processors to perform operations comprising:
    obtaining a data point of a tracked eye gaze at a predetermined sampling interval of a displayed three-dimensional image of an object in a viewing area, the data point representing a detected location of the tracked eye gaze within the viewing area;
    identifying eye attentiveness points on a surface of the displayed three-dimensional image by applying an unprojection process to translate the obtained data point to a point on the displayed three-dimensional image; and
    modifying the displayed three-dimensional image based on the identified eye attentiveness points.

15. The computing device of claim 14, wherein the instructions cause the one or more computer processors to perform further operations including mapping the identified eye attentiveness points to a plurality of surface regions of the displayed three-dimensional image.

16. The computing device of claim 14, wherein the operations further comprise determining a surface region of the plurality of surface regions with a highest degree of saliency based on the mapping.

17. The computing device of claim 14, wherein the operations further comprise modifying the displayed three-dimensional image by rotating the object to face, the viewing direction of the displayed object to the determined surface region in the modified displayed three-dimensional image.

18. The computing device of claim 14, wherein the unprojection process is applied by multiplying an unprojection matrix with coordinates of a gaze location, the unprojection matrix is calculated based on a projection matrix used for projecting the surface of the object onto the viewing area.

* * * * *

UNITED STATES PATENT AND TRADEMARK OFFICE
CERTIFICATE OF CORRECTION

| | | |
|---|---|---|
| PATENT NO. | : 8,797,261 B2 | Page 1 of 1 |
| APPLICATION NO. | : 14/024015 | |
| DATED | : August 5, 2014 | |
| INVENTOR(S) | : Yuan | |

It is certified that error appears in the above-identified patent and that said Letters Patent is hereby corrected as shown below:

In the Specification

Column 13, Line 51, delete "eyes 220" and insert -- eyes 200 --, therefor.

Signed and Sealed this
Sixteenth Day of December, 2014

Michelle K. Lee
*Deputy Director of the United States Patent and Trademark Office*